United States Patent Office 2,740,963
Patented Apr. 3, 1956

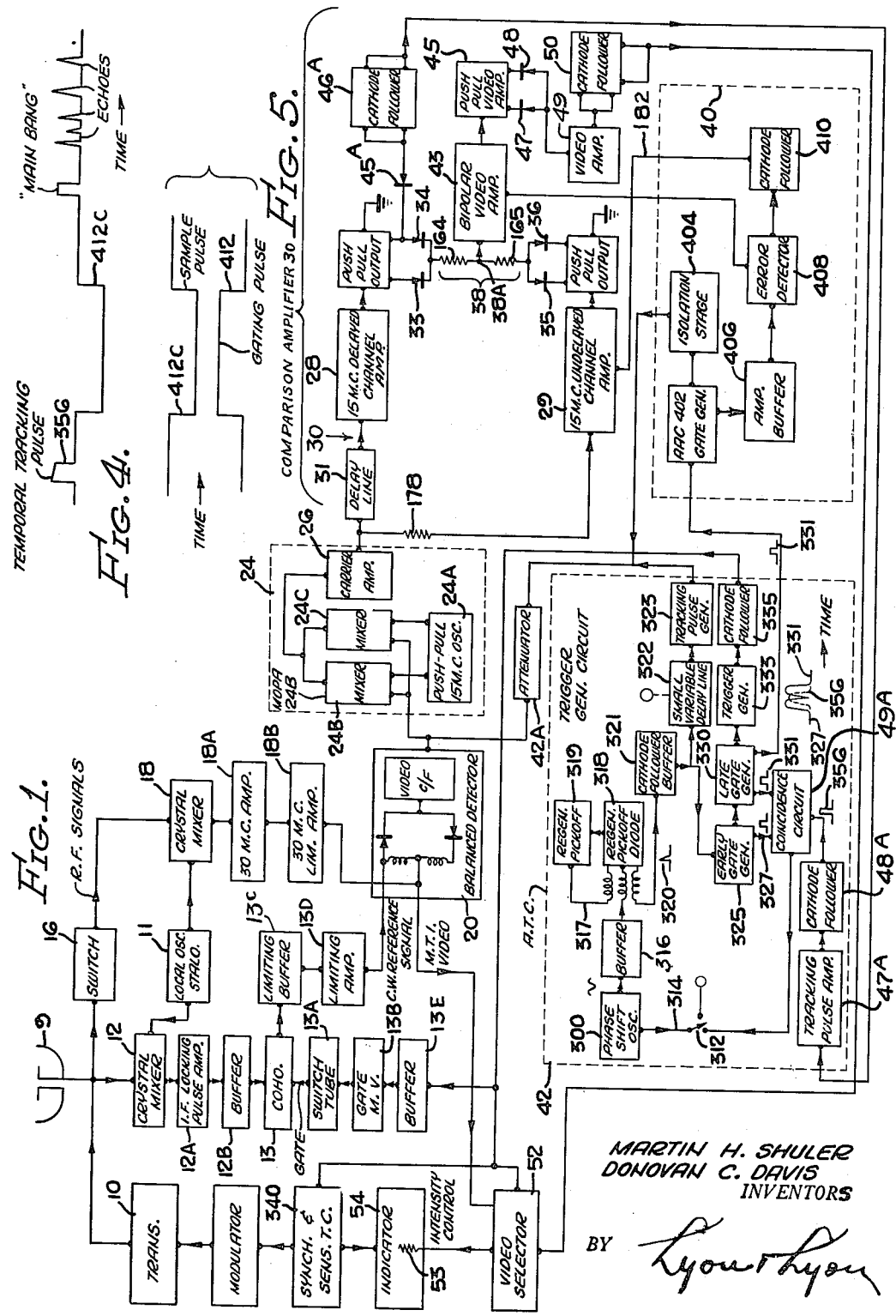

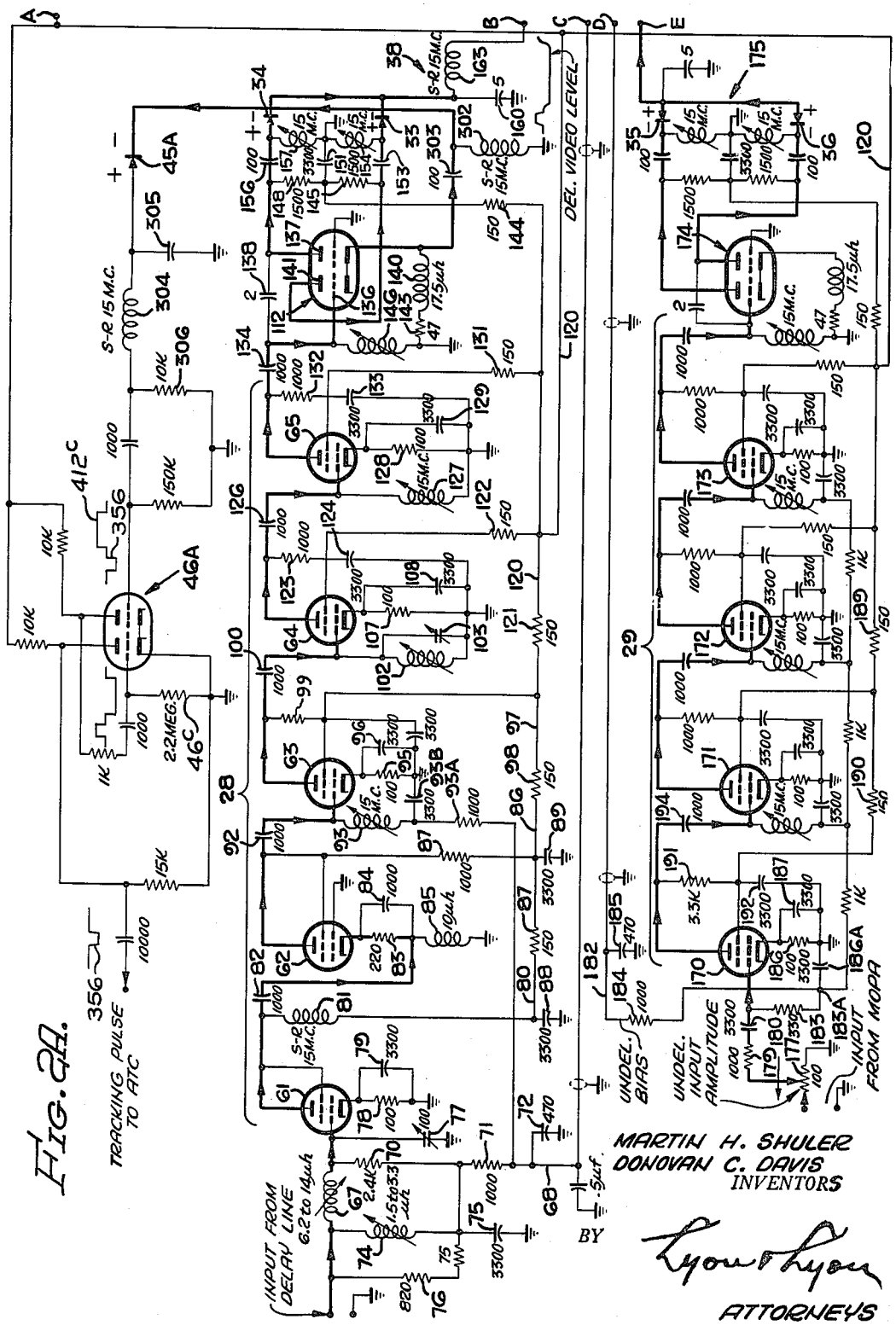

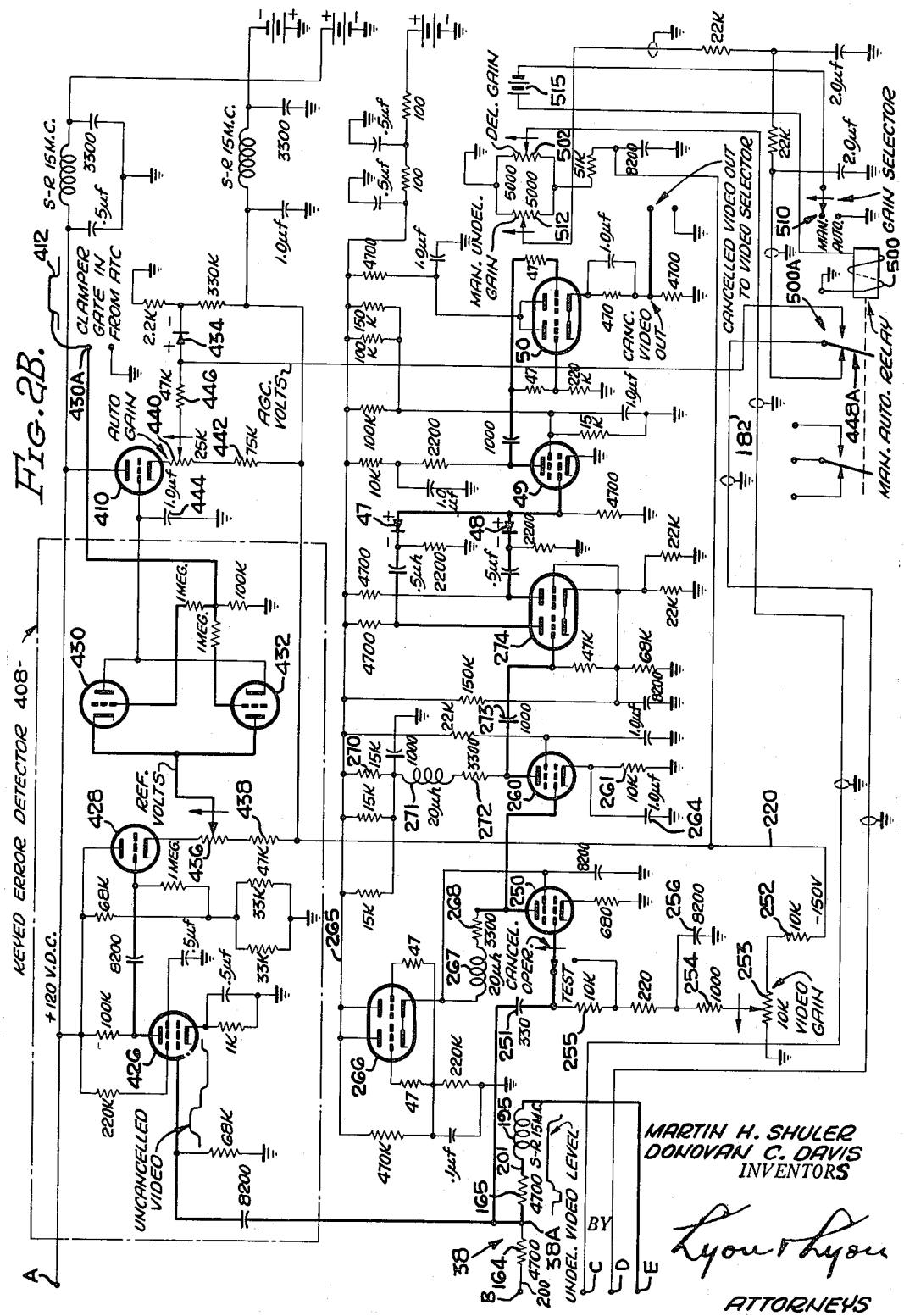

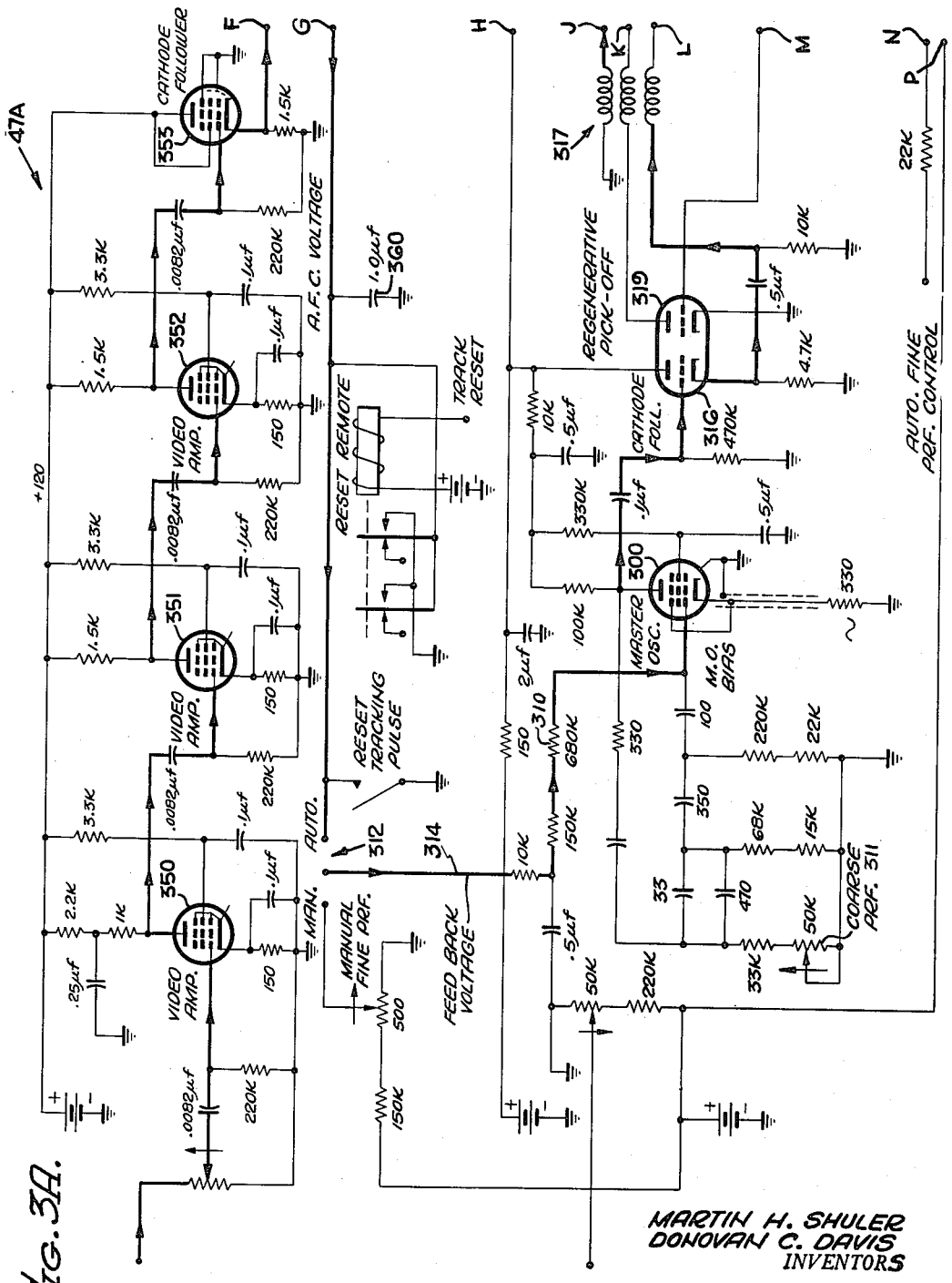

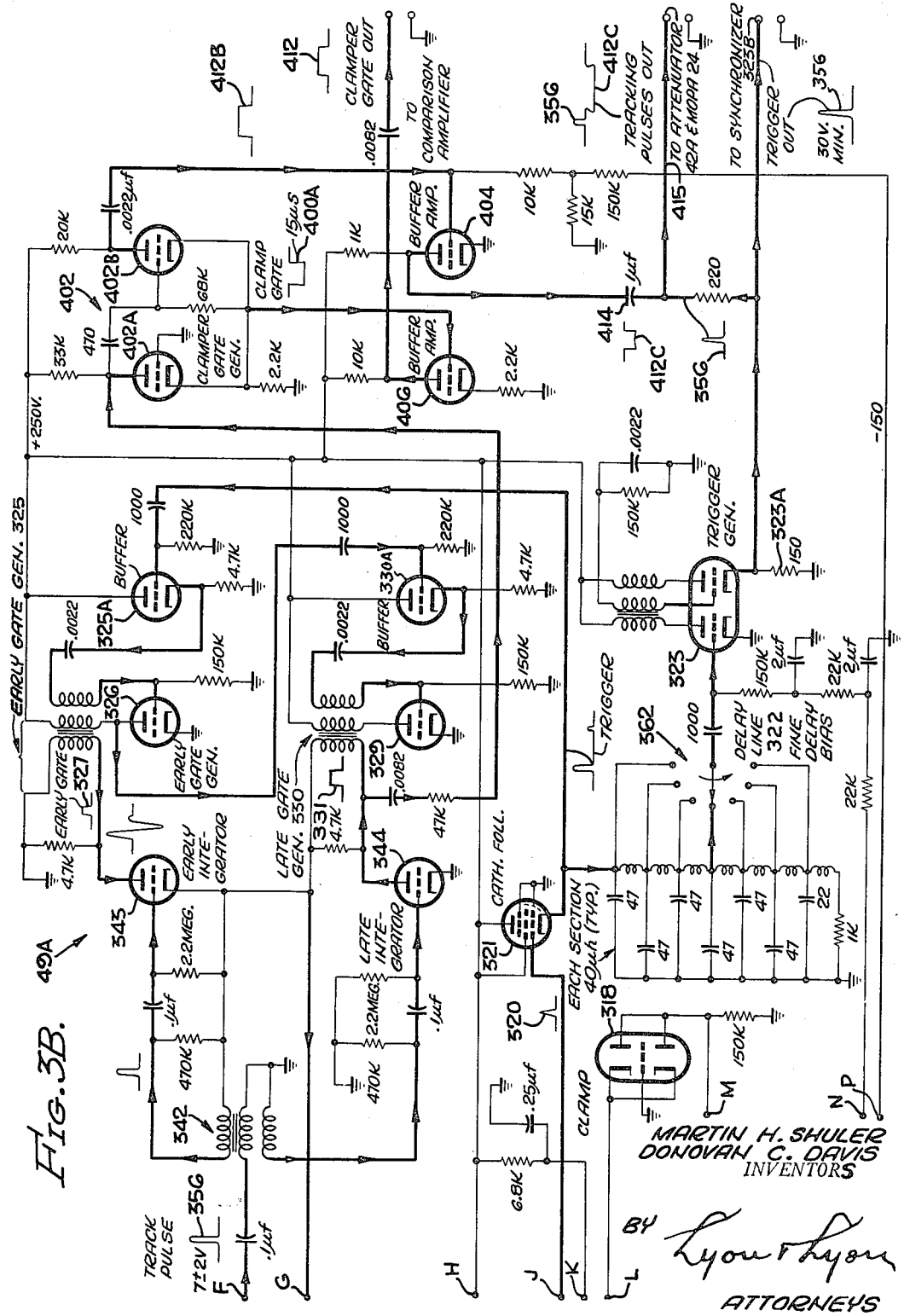

2,740,963

AUTOMATIC AMPLITUDE CANCELLATION IN MOVING TARGET INDICATOR

Martin H. Shuler, Los Angeles, and Donovan C. Davis, South Pasadena, Calif., assignors to Gilfillan Bros., Inc., Los Angeles, Calif., a corporation of California Application January 29, 1951, Serial No. 208,414

13 Claims. (Cl. 343—17.1)

The present invention relates to improvements in radar sets generally and more specifically to improvements in moving target indicating (M. T. I.) systems.

In ground controlled approach (G. C. A.) radar sets the technique necessarily involves detection of low flying aircraft. Unless the radar set is very carefully sited, an approaching aircraft may be obscured by echoes from stationary objects at the same range. The aircraft may be confused with a multiplicity of irrelevant targets, during a period when the time element is all important. There are occasions when it is impossible to site the radar equipment in such a way as to eliminate this problem.

The addition of moving target indicating (M. T. I.) systems allows an oscilloscope presentation or a remote control presentation sensitive only to moving targets. This eliminates the above siting problem since ground, tree and building targets do not then appear on the oscilloscopes and/or their presence does not affect the remote control arrangement. Approaching planes may be seen though they are in the midst of what otherwise manifests itself as so-called ground clutter.

The detection of a moving object, in accordance with the system shown herein, depends upon change of the phase of the radio frequency echo from the object. Whereas with earlier radar sets, only amplitude changes could be observed, the advent of "coherent pulse" techniques makes possible the observation of phase change between a transmitted pulse and a received pulse.

The problem of discriminating against spurious phase change in systems of this type is important and in order to achieve a satisfactorily operating system, cognizance must be taken of the fact that amplitude change frequently implies phase change of the same order of magnitude and vice versa.

It is an object of the present invention to provide an improved moving target indicating system which has general application in all types of radar systems and is particularly useful in the so-called precision section of a ground controlled approach (G. C. A.) landing system wherein the pilot of a plane may be "talked" down or his plane automatically operated in accordance with indications or voltage variations produced in the radar set located adjacent the landing strip.

Another object of the present invention is to provide an improved moving target indicating system of the type in which observed moving objects are differentiated from stationary objects by the phase difference in reflected waves from a moving target, and the absence of phase differences in reflected waves of a stationary target, and in which the resulting phase variations produced by a moving target are converted into amplitude variations, the present improved system being characterized by the fact that differences in amplitude of the received signals, applied to different channels, are compensated in such a manner that indications are produced only in accordance with phase variations and undesired amplitude variations in the system are balanced out to have substantially no effect on the indicator.

Another object of the present invention is to provide an improved moving target indicating system of the type in which moving targets are discerned by phase changes and these phase changes are converted into amplitude variations, a characterizing feature of the present improved system being that amplitude variations in the system are compensated or balanced so that the ultimate amplitude variations in the indicating system truly represent the position of a moving target.

Still another object of the present invention is to provide an improved moving target indicating system including an automatic temporal control (A. T. C.) and an automatic gain control cooperating together so that the ultimate amplitude variations in the indicating system truly represent the position of a moving target.

Still another object of the present invention is to provide an improved radar set including a moving target indicating system which comprises an undelayed channel, a delayed channel associated with an automatic temporal control serving to control the operation of the transmitter portion of the set, and an automatic gain control also cooperating with such delayed channel and said automatic temporal control so that the resulting signals in either an indicator or a remote control system derived from echoes may truly represent the position of a moving target.

The features of the present invention which are believed to be novel are set forth with particularity in the appended claims. This invention itself, both as to its organization and manner of operation, together with further objects and advantages thereof, may be best understood by reference to the following description taken in conjunction with the accompanying drawings in which:

Figure 1 is a schematic block diagram of a radar system embodying the present invention.

Figure 2, which in fact includes both Figures 2A and 2B on separate drawing sheets, shows in more detailed form the comparison amplifier embodying features of the present invention in the system shown in Figure 1; it being noted that terminals having identical reference letters in Figures 2A and 2B are connected together.

Figure 3, which in fact includes both Figures 3A and 3B on separate drawing sheets, shows in more detailed form the automatic temporal control shown in the system in Figure 1 which cooperates with the circuit shown in Figure 2 to produce new results forming the basis of certain features of the present invention; it being noted that terminals having identical reference letters in Figures 3A and 3B are connected together.

Figure 4 shows in graphical form the time relationship of the automatic temporal tracking pulse and the long negative pulse used for amplitude cancellation control in relationship to the radar video signals, as present in the apparatus shown in the preceding figures; and Figure 5 shows the time relationship of the long negative pulse used for amplitude cancellation control, in comparison with the gating pulse as such pulses appear in the comparison amplifier.

Effectiveness of a radar set depends largely on how well the "blip" representing the target of interest may either be seen on the screen of the indicator or corresponding voltage variations may be used to, in turn, control the flight of the target. Since the reflection from all objects, whether stationary or moving, results normally in echo-indications either on the screen, where an indicating screen is used, or in voltage or current variations in a remote control system for controlling a target, the target of particular interest may be obscured by the echoes of stationary objects such as buildings, trees, chimneys, etc., to the extent that the usefulness of the radar set may be seriously impaired. This is especially true of the region near the radar set in G. C. A. systems, where ground clutter is relatively predominant at close range.

In order to accomplish the discrimination between fixed and moving targets, the radar set described herein is made sensitive to a change of the phase angle of a return pulse or echo as compared with the phase of the transmitted pulse, using the Doppler effect to distinguish moving targets from stationary objects although certain features of the present invention are applicable likewise to other types of moving target indicating systems. This phase sensitivity is obtained by adding a returning echo signal at intermediate frequency to a phase coherent continuous wave, CW, oscillation of the same nominal frequency. The change of phase angle from pulse to pulse of the energy reflected from moving targets is readily detectable and makes possible an M. T. I. system which is highly sensitive to objects having a wide range of velocities. The so-called coherent pulse Doppler system shown herein employs phase locking between the pulsed transmitter and a continuous wave oscillator as is described in more detail hereinafter.

Briefly, the phase variations of moving target echoes are converted into amplitude variation by a process known as "phase detection." The echo train from each outgoing pulse is "stored" in a first channel including a delay line for an exact repetition interval. This stored echo train is compared with the echo train of the succeeding pulse applied to a second channel. In order to make a true comparison, there is associated with one of said channels a compensating or gain control network in accordance with an important feature of the present invention. In making such comparison, any echo which occurs with no change of amplitude is discarded since it comes from a fixed or stationary target while any echo which recurs with changed amplitude is either presented on the indicator or may be used to effect remote control, since it comes from a moving target.

It was previously stated that the echo return from a moving target changes its phase relative to the radar transmitter from pulse to pulse. The term "phase relative to the transmitter" may be considered in light of the following statement: If the transmitter were to continue oscillating after the main pulse, the point in the R. F. or radio frequency cycle reached by the transmitter pulse at the instant the resulting echo pulse returns would determine the phase relationship between the transmitted and echo reflected pulses.

Referring to the drawings, a pulse from radar transmitter 10 is applied to the antenna 9 and simultaneously to the crystal mixer stage 12. The pulse applied to stage 12 is first converted to an intermediate frequency of 30 megacycles by beating with oscillations from a local oscillator 11 applied to the crystal mixer 12, termed also the "locking pulse mixer," and the resulting IF or intermediate frequency "locking pulse" produced by superheterodyne action is used to control the phase of an oscillator 13 at the intermediate frequency. This oscillator 13 is then used as the phase reference instead of the transmitter itself. Thus, the oscillator stage 13, acts as a phase reference for the intermediate frequency signals and is locked in phase or is made coherent at the time of each transmitted pulse.

The output of the locking pulse mixer 12 is amplified by a three stage locking pulse amplifier 12A. The output of this locking pulse amplifier 12A is used to drive a class C buffer stage 12B which is biased to cut-off to produce a circuit independent of signals below a predetermined level of the locking pulse. The buffer stage 12B is used to excite a high Q tank or frequency determining circuit in the oscillator stage 13 which is a modified Hartley oscillator, of resonant frequency 30 megacycles. Stage 13 is hereafter termed the *COH*erent *O*scillator or COHO because its oscillations are locked in phase or made coherent with the phase of the intermediate frequency oscillations derived from the pulse of transmitter 10 in mixer 12.

The COHO oscillator stage 13 is arranged in such a way that the oscillator can be turned on and off by a video gating pulse from switch tube 13A caused by the automatic temporal control (A. T. C.) described hereinafter. In other words, to facilitate the locking process, the oscillator stage 13 is switched off for a short time before the arrival of the locking pulse. While COHO is thus turned off by such a video gating pulse, the locking pulse from buffer stage 12B is applied to the tank or frequency determining circuit of COHO to produce forced oscillations therein. Oscillations will continue in this high Q tank circuit for several microseconds after the locking pulse has been removed and the oscillator 13, when it starts up again, has the phase of such forced oscillations.

To summarize this step: COHO is interrupted before each transmitted pulse and is started and locked in phase with the intermediate frequency pulse derived from the transmitted radio frequency pulse. The object of this operation is to preserve the same phase difference on successive pulses between COHO and the intermediate frequency signal from a given fixed target. The phase difference will be the same if the target does not move and if the frequency of COHO and the local oscillation 11 remains substantially constant.

At the time the "locking" pulse is applied to COHO 13, it is in a switched-off condition by the conduction in the switch tube 13A connected to the COHO gate multivibrator 13B, rendering the grid in the COHO oscillator stage 13 to a sufficiently negative value to achieve the purpose. Approximately one microsecond after the beginning of the locking pulse which is of duration longer than one microsecond, the COHO stage 13 is switched back on and produces oscillations in phase with the oscillations comprising the locking pulse. This switching on and switching off of COHO in timed relationship with the locking pulses insures that the COHO continuous wave output will be coherent, that is, that it will be locked in phase with the phase of the IF signal resulting from the transmitted pulse.

The output of COHO 13 is passed through two limiting amplifiers 13E and 13D which limit the signal from COHO to a value comparable to the value of the echo signal applied likewise to a balanced detector 20 from the mixer 18.

Echo pulses received on antenna 9 and passed by the TR box 16 are converted in mixer 18 to the intermediate frequency of 30 megacycles by superheterodyne action for comparison with the CW reference signal derived from the amplified output of COHO 13 in a conventional balanced phase detection circuit 20 forming a portion of the so-called MTI receiving unit which is preferably of the limiting type incorporating an amplifying stage 18A and limiting amplifier 18B, although it likewise may be of any suitable type.

For satisfactory phase detection at the intermediate frequency level of 30 megacycles, the same local oscillator 11 is used in the conversion of the R. F. locking pulse and the conversion of the echo pulse to the same intermediate frequency. Furthermore, it is desirable that this local oscillator 11 be extremely stable in frequency. The MTI local oscillator 11 is known as the *STA*bilized *L*ocal *O*scillator—STALO. It may include a klystron tube stabilized by an "S-band" echo box used as a cavity resonator.

Since the same local oscillator, STALO, feeds both the signal mixer and the locking pulse mixer, its phase at the time of the transmitted pulse affects equally both the continuous wave reference I. F. signal and the radar pulse echo I. F. signal. Hence, the starting phases of the transmitter and the local oscillator cancel out when the I. F. echo signal and the I. F. reference signal beat against each other in detector 20. Therefore, the phase of the output of detector 20 depends only on the range or the number of cycles executed by the local oscillator and by the coherent oscillator during the echo-time. When the target is moving, its range will change from pulse to pulse and a fluctuating output signal results from the corresponding change in the phases traversed by the oscillators during the echo-time.

The MTI receiver including the 30 megacycle amplifier 18A and the 30 megacycle limiting amplifier 18B amplifies and limits the intensity of the I. F. echo or return signal with a predetermined gain vs. amplitude characteristic, and in the balanced detector 20 thereof compares the phase of these echo or return signals with the previously mentioned signals of like limited magnitude from reference oscillator, COHO, and then converts the resulting phase difference to a corresponding amplitude variation.

Once the phase variations have been converted into amplitude variations by the phase detection circuit 20 in the receiver, the resulting phase coherent video is used to modulate a 15 megacycle carrier produced in the *Master Oscillator-Power Amplifier*—MOPA 24. The echo train on this carrier after amplification in amplifier 26 is sent along two different channels 28, 29 in a comparison amplifier 30, one of which channels includes the delay line 31.

The function of the comparison amplifier is to compare the delayed phase coherent video from the delay line 31 with the undelayed phase coherent video, in such a manner as to cancel all echoes except those whose R. F. phase has shifted between pulses in accordance with the Doppler principle.

These carriers leaving the output of such channels 28, 29 are demodulated respectively by crystal detectors 33, 34 on the one hand and crystal detectors 35, 36 on the other hand, after which the video envelopes are compared in the subtraction circuit 38.

The subtraction circuit 38 is known also as the cancellation network, and is so arranged that only the echoes whose amplitudes vary from pulse to pulse produce a difference or resultant signal. Such a resultant signal is referred to as M. T. I. cancelled video.

Moving targets are distinguishable from stationary targets because their phase variations are converted into amplitude variations. The character of these amplitude variations is preserved, and no extraneous ones introduced when they pass through the two different channels 28, 29, by a compensating network 40 or automatic gain control embodying important features of the present invention.

Since the resultant signal appearing in the cancellation net work 38 is representative of a moving target, it is both positive and negative and is thus bipolar in nature. The bipolar signal is amplified in the bipolar video amplifier 43 and the push-pull stage 45, detected in crystal rectifiers 47, 48, after which the modulation components are successively applied to video amplifier stage 49, cathode follower stage 50 and video selector unit 52 before being applied to the intensity control grid 53 in a cathode ray tube forming a component of the indicator 54. Alternatively or conjointly instead of being applied to the intensity control grid 53, the video may be applied and used in a remote control system of the type shown, described and claimed in the copending patent application of Coy M. Byerly, Serial No. 196,310, filed November 17, 1950, which application is assigned to the same assignee as is the present application.

The delay means in the MTI system shown herein consists of means necessary for making a temporal (time) delay in any given video train so as to permit comparison with the succeeding video train and cancellation of "fixed" phase signals in the cancellation network 38. The comparison function implies the need for exact temporal cancellation, and hence the delay system includes circuits for making the delay interval equal to the repetition interval between pulses transmitted from transmitter 10. The circuit for accomplishing this function includes as elements thereof the master oscillator-power amplifier (MOPA) 24, the supersonic delay line 31, and the automatic-temporal-cancellation (ATC) unit 42.

The function of the delay line 31 is to delay the phase coherent signal train delivered to it from MOPA 24 for the time interval between each transmitted pulse. The delay line 31 is, per se, conventional and may consist of a column of mercury of 0.375-inch diameter, with a quartz crystal at both ends, all confined by a stainless steel tube.

The video-modulated 15-megacycle carrier signal from MOPA 24 is impressed on the transmitting crystal in the delay line 31, which crystal responds with mechanical vibrations of the same frequency, setting up acoustical waves in the mercury. This crystal has a resonant frequency approximately equal to the carrier frequency, but the damping caused by the intimate contact with the mercury is sufficient to make the resulting resonance curve of the crystal very broad.

The length of the mercury column in delay line 31 may be approximately 57 inches, so as to give a delay interval of 1000 microseconds, based on the velocity of acoustical waves in the mercury at 20 degrees centigrade. The attenuation suffered by the supersonic signals in the line is high—approximately 70 to 80 db when the delay line 31 is terminated in an impedance of 75 ohms.

As mentioned above, the video signals in the output circuit of the balanced detector 20 of the MTI receiver, are phase-coherent or phase-locked video signals, bipolar in nature. These video signals are not applied directly to the supersonic delay line 31 because they would be seriously distorted. Hence it is desirable to modulate an R. F. carrier with the video signals and send this carrier through the delay line. This is the function of MOPA. MOPA accomplishes the function of generating a carrier in oscillator stage 24A, modulating it with video in balanced mixers 24B, 24C, and driving the delay line 31 after the modulated carrier is amplified in stage 26.

The characteristics of the "delayed" carrier channel 28 are similar to those of 15 megacycle IF strip in a radar receiver. This circuit is designed to amplify, with negligible distortion, the signals from the output of delay line 31 so that they will be of suitable amplitude when detected.

The "undelayed" channel 29 takes signals directly from MOPA 24, attenuates them to a level comparable to the delayed input signal level, amplifies them through a 15-mc. amplifier comprising a plurality of stages similar to the stages in the "delayed" channel 28, and detects them in a push-pull detector including crystals 35, 36 identical with that in the delayed channel 28.

To insure efficient and accurate automatic temporal cancellation, it is preferred to produce a tracking pulse 356 in the automatic temporal control unit 42 and to introduce the same into the input circuit of MOPA 24 and through the signal delay line 31. This may be done without upsetting cable terminations and without the necessity of introducing an additional tube by passing such tracking pulse through a resistive attenuator network 42A. This is possible because the tracking pulse at the output of the temporal cancellation unit 42 is much larger than may be desirably introduced directly into the balanced modulator circuit in MOPA 24. The tracking pulse 356 applied from the automatic temporal control unit 42 travels the following path: from A. T. C. 42, through attenuator 42A, through MOPA 24 wherein it modulates the carrier generated therein through the delay line 31, through the "delayed" channel 28, through the crystal detector 45A wherein the pulse is separated from its carrier through the cathode follower stage 46A and then back to the A. T. C. unit 42.

Such tracking pulse, in its passage through such circuit, should preferably not be subject to the back-biasing of the crystals which feed the automatic amplitude balance circuit in the comparison amplifier.

Such tracking pulse 356, as it enters the A. T. C. unit 42, is first amplified in stage 47A and then applied through thode follower stage 48A to a coincidence circuit 49A herein an early gate voltage and a late gate voltage coact ith such tracking pulse voltage for achieving the desired sult in a manner described in detail hereinafter in conection with the description of Figure 3.

In accordance with an important feature of the present vention, a negative pulse 412C of, for example, 15 icroseconds duration, follows the tracking pulse 356 as own in Figure 4, and such tracking pulse 412C also avels substantially the same path as the temporal tracking pulse 356.

Briefly, the temporal tracking pulse 356 is generated in the automatic temporal cancellation unit 42, and the ate gate 331, also generated in the unit 42, initiates the peration of the automatic amplitude cancellation gate enerator 402 (Figure 3B), the output of which is applied o the attenuator 42A after passing through the isolation or buffer stage 404 for subsequent modulation of the 5 microsecond carrier wave generated in MOPA 24 nd applied to the delay line 31. Also generated in the ate generator 402 is a clamp gating voltage which, after assing through the amplifier and buffer stage 406, is pplied to the keyed error detector circuit 408 in which effectively a comparison is made between such gating oltage and the canceled video residue applied from the ideo amplifier 43 in the comparison amplifier 30 to the rror detector circuit 408. Such canceled residue includes the tracking or sample pulse 412C (Figure 5), such ample pulses 412C being compared in the error detector 408 with the clamp gating voltage 412 developed in the generator 402 and likewise supplied to the detector 408. A continuous voltage is developed in the error detector 408, which varies in accordance with the canceled video residue, which is sampled in the stage 408, and such continuous voltage, after being applied to the cathode follower stage 410, serves to control the bias voltage on variable mu amplifier tubes in the undelayed channel 28 to thereby vary the gain of the delayed channel 28 in accordance with such canceled video residue supplied from the comparison amplifier. By this expedient, using the means which are described in greater detail hereinafter, automatic amplitude cancellation is obtained. Thus, it is observed that the tracking pulse 356 (Figures 1 and 4) is used to obtain temporal cancellation, and the next succeeding negative pulse 412C which appears in timed relationship with the tracking pulse 356 is used to obtain automatic amplitude cancellation.

*Comparison amplifier 30*

As shown in Figure 2, the delayed channel amplifier 28 includes five stages comprising electron discharge devices 61, 62, 63, 64 and 65. Each stage is tuned broadly to 15 megacycles. Since the attenuation in delay line 31 is large, the output voltage of the delay line is usually not very much greater in amplitude than the noise generated in the input stage of the delayed channel amplifier 28 or in the input circuit for device 61. In order to prevent impairment of the signal to noise ratio as measured in such input circuit, two precautions are taken as follows:

(1) The efficiency of the coupling between the delay line 31 and the input circuit for amplifier 28 is made as high as possible in order to maximize the amplitude of signals in the input circuit of the first stage; high efficiency of coupling being obtained by placing the amplifier unit 28 as close as possible to the delay line output terminals, by minimizing stray capacitance and by using a double tuned circuit to also preserve wide-band pass characteristics.

(2) A low noise input circuit is used to minimize the noise generated in the input stage.

The second stage 62 is operated as a grounded grid triode with the input voltage from stage 61 applied to the cathode of device 62. Operated thus, tube 62 furnishes a low plate impedance for device 61. Although the plate current of tube 62 has the same noisy nature as that of tube 61, the noise suffers almost complete degeneration since its path is through the high impedance represented by the dynamic plate resistance of tube 61.

Specifically, the ungrounded terminal of the two-terminal output circuit from the delay line 31 is connected to the grid of device 61 through a variable inductance 67. The grid of device 61 is also connected to the delayed channel bias voltage lead 68 through resistance 70 and an isolating resistance 71, the line 68 being grounded through condenser 72 for high frequency signals, also, the junction point of one terminal of inductance 67 and the connected output terminal of the delay line is connected to ground through a serial circuit comprising a variable inductance 74 and a condenser 75, the inductance 74 being shunted by a resistance 76. The grid circuit for device 61 may be tuned by the variable condenser 77 which is connected between the grid of device 61 and ground.

The cathode of device 61 is connected to ground through a shunt connected cathode bias arrangement comprising resistance 78 and condenser 79.

The anode of device 61 receives space current from the positive anode lead 80 through coil 81 self-resonant at 15 megacycles. Also, the anode of device 61 is coupled to the cathode of device 62 through coupling condenser 82 and the shunt connected bias arrangement comprising condenser 84 and resistance 83, the junction point of condenser 82 with such bias arrangement being grounded for direct current through the high frequency choke coil 85.

The anode of device 62 receives its space current from the high potential lead 86 which is connected to the anode of device 62 through the voltage dropping resistances 87. Lead 86 is connected to lead 80 through one of the voltage dropping resistances 87, leads 80 and 86 being grounded for high frequency voltages through the bypass condensers 88, 89.

Output voltages appearing at the anode of device 62 are applied to the control grid of device 63 through the coupling condenser 92, the grid of device 63 being connected to the gain control lead 68 through the tunable coil 93 and isolating resistance 93A. The coil 93 may be tuned to resonate the input circuit of tube 93 at 15 megacycles with the junction point of resistance 93A and coil 93 connected to ground through the filtering condenser 93B.

The cathode of device 63 is grounded through the condenser resistance bias arrangement comprising shunt connected resistance 95 and condenser 96.

Space current for device 63 is supplied from the high voltage lead 97, the lead 97 being connected to lead 86 through voltage dropping resistance 98 and being directly connected to the screen of the 6AK5 discharge device 63 and also being connected to its anode through resistance 99. The anode of device 63 is coupled to the control grid of device 64 through coupling condenser 100.

The amplitude-frequency response of the mercury delay line 31 is not flat, in fact the amplitude response of the delay line 31 decreases continuously with increasing frequency. Therefore, it is desirable to introduce in the coupling circuit between the stages 63 and 64 of the delay channel amplifier 28 a compensating network. This compensating network consisting of variable inductance coil 102, shunt connected with a variable condenser 103, has a gain characteristic of the same shape as the attenuation characteristic of the delay line 31, thus making the overall response of the line and the amplifier substantially flat for the frequency band of interest. This compensating network 102, 103, comprising a single tuned circuit, has its ungrounded terminal connected to the control grid of device 64. The cathode of device 64 is grounded through a resistance condenser biasing arrangement comprising resistance 107 and shunt condenser 108.

The compensation introduced by the network 102, 103 is obtained by adjusting the grid circuit of device 64 to a frequency F' higher than the carrier frequency F. The frequency F' and the Q of such grid circuit are such that a gain characteristic is produced which is complementary of the attenuation characteristic of the delay line 31 in a range of frequencies above the frequency F.

Space current for device 64 is applied from high voltage lead 120 which is connected to lead 97 through resistance 121 and which is connected to the anode of device 64 through the serially connected resistances 122, 123, the junction point of resistances 122, 123 being connected to the screen grid of device 64 and being substantially connected to ground for high frequency voltages through the bypass condenser 124.

Amplified voltages appearing on the anode of device 64 are coupled to the grid circuit of device 65 through coupling condenser 126, such grid being connected to ground through the variable coil 127 which may be tuned to be self-resonant at 15 megacycles. The cathode of device 65 is connected to ground through a condenser resistance biasing arrangement comprising shunt connected resistance 128 and condenser 129.

Space current for device 65 is obtained from the high voltage lead 120 which is connected to the anode of device 65 through the serially connected resistances 131, 132, the junction point of resistances 131, 132 being connected to the screen grid of device 65 and being grounded for high frequency voltages through the bypass condenser 133.

After amplification in the five stages 61, 62, 63, 64 and 65, the resulting amplified voltage is applied to a phase-splitting stage 112, including an RCA type 6J6 discharge device. This phase-splitting stage 112 drives a full wave detector which includes two germanium crystals 33, 34. Full wave detection is used because of its greater fidelity to the modulation envelope. The amplification preceding detection is sufficient to insure that, for all signals of interest, the crystals will rectify in the linear region of their characteristic.

After the signal is rectified, it is applied to a cancellation network 38 to which also is applied amplitude detected signals from the 15 megacycle undelayed channel 29.

Specifically, the amplified voltage appearing on the anode of device 65 is applied to the control grid 136 of the phase-splitting stage through coupling condenser 134. The grid 136 is connected to ground through the variable self-resonant tuning coil 146 and also to the anode 137 through coupling condenser 138. The two cathodes of device 112 are interconnected and grounded for direct current through the high frequency choke coil 140 and serially connected resistance 143.

Space current for the anode 141 associated with grid 136 is supplied from the high voltage lead 120 through the serially connected resistances 144, 145. Space current for the other anode 137 is also supplied from the high voltage lead 120 but through the serially connected resistances 144, 148. The grid associated with anode 137 is grounded.

The resulting amplified signals are thus applied with opposite phase across the serially connected resistances 145, 148, the junction point of said resistances 145, 148 being connected to ground through condenser 151 and the opposite terminals of resistances 145, 148 being connected to ground respectively through the serial circuit comprising condenser 153 and variable inductance 154 and through the serial circuit comprising condenser 156 and variable inductance 157.

The crystal rectifiers 33, 34 have their common terminals grounded through condenser 160, the positive terminals of rectifiers 33, 34 being connected respectively to the ungrounded terminals of coils 154, 157.

The connected negative terminals of rectifiers 33, 34 are connected to one terminal of resistance 164 in the cancellation network 38 through the wave trap 163 comprising a coil self-resonant at 15 megacycles so as to act as a filter.

As will be described in detail later, a similar signal from the undelayed channel 29 is applied to the resistance 165 which has one of its terminals interconnected with the terminal of resistance 164 at the junction point 38A. The voltage appearing at the junction point 38A of resistances 164, 165 is, after modification, applied to the intensity control electrode 53 (Figure 1) of the indicator 54.

Now that the delayed network is described in detail, a description of the undelayed channel 29 follows, but with less detail because of similarity of elements:

The undelayed channel 29 includes four amplifying stages 170, 171, 172, 173 feeding into a phase-splitting circuit 174. The amplifying stages 171, 172 and 173 are each identical and are connected in identical manner to the next succeeding and next preceding stage as are the stages 63 to 65 in the delayed channel 28. Since the circuitry of the amplifying stages 63 to 65 is described hereinabove, it is considered unnecessary to describe the circuitry of the stages 171, 172 and 173 in detail. The same is true with respect to the phase-splitting circuit 174 and full wave rectifying circuit 175 into which the stage 174 feeds. This is true since stage 174 and rectifier circuit 175 are identical respectively to the phase-splitting circuit 112 and interconnected full wave rectifier, including rectifiers 33, 34 described in detail hereinabove.

The input stage 170 in the undelayed channel 29 may be considered to be equivalent to the input stages 61, 62 considered as a unit. It is noted that a compensating network similar to the compensating network 102, 103 in the delayed channel 28 is not provided in the undelayed channel 29, compensation being made entirely for attenuation introduced in the delay line in the delayed channel 28 alone.

The undelayed channel 29 receives a signal of amplitude relatively large compared to the amplitude of the signal received by the delayed channel 28. The input signal for channel 29 is developed across a potentiometer type of resistance 177 having one of its terminals grounded and the other one of its terminals connected to the ungrounded output terminal of MOPA 24, the movable tap on the resistance 177 being connected to the control grid of device 170 through the serially connected resistance 179 and condenser 180.

Since the signal level in the input circuit of stage 170 is relatively high, a low noise input circuit of the type described in the delayed channel 28 is not used. However, in order to equalize the gain variations in the two channels 28, 29, occasioned by filament voltage fluctuations, etc., approximately the same number of tubes is used in the channel 29 as in the delayed channel 28.

The control grid of device 170 is connected to the undelayed channel bias lead 182 through the serially connected resistance 183 and isolating resistance 184, the lead 182 being maintained substantially at ground potential for high frequency signals by the bypass condenser 185. The cathode of device 170 is grounded through a grid bias arrangement comprising the shunt connected resistance 186 and condenser 187. It is noted that the junction point 183A of resistances 183 and 184 is grounded for high frequency currents through condenser 186A.

Space current for device 170 is supplied from the high voltage lead 120 which is connected to the anode of device 170 through serially connected resistances 189, 190 and 191, the junction point of resistances 190 and 191 being connected to the screen grid of device 170, which screen grid is maintained substantially at cathode potential for high frequency signals by the bypass condenser 192.

Amplified signals appearing on the anode of device 170 are applied to the control grid of device 171 through coupling condenser 194. Then after successive amplification in stages 171, 172 and 173, the resulting ampliude signal is split into two components, 180° out of phase, and applied to the full wave rectifier circuit 175, after which the rectified components are applied through the wave trap or filter element 195 to resistance 165 in the same manner as described above in connection with stages 65, 112 and the associated full wave rectifier including rectifiers 33, 34.

The voltages thus applied to the resistances 164, 165, respectively, from the delayed channel 28 and undelayed channel 29 are of opposite polarity; and, when such voltages are of equal amplitude, and occur simultaneously, the voltage across terminals 200 and 201 of the cancellation network 38 is zero and also the junction point 38A is at zero potential with respect to ground.

In order to effect such a balance of the output voltages from the two rectifiers associated respectively with the channels 28, 29 in the cancellation network 38, the signal level at the input to the undelayed channel 29 may be varied by varying the position of the tap on the potentiometer type of resistance 177. This resistance 177, which may be in the order of 100 ohms, forms an attenuating voltage divider.

The cancellation network 38 comprises the two identical resistances 164, 165 and the two parallel resonant radio frequency filter inductances 163 and 195. The two self-resonant inductances 163, 195 isolate the cancellation network from the radio frequency components of the detector or rectifier output.

It is noted that although the crystal detectors 35, 36 are connected in an identical rectifying circuit, as are the crystals 33, 34, the polarities of crystals 35, 36 are opposite to the polarities of the crystals 33, 34.

Hence, similar video signals from each detector, when presented to the cancellation network at the same time, result in a zero voltage potential at the junction point of the two resistances 164, 165, since the polarity of the voltages across these resistances are reversed. The detector associated with the delayed channel 28 may therefore be characterized as the plus detector, and the detector associated with the undelayed channel may be characterized as the minus detector. Any simultaneous video signals which are constant in character and amplitude are cancelled effectively to zero at the cancellation network, whereas signals of unequal or varying amplitude and polarity will occur in the cancellation network with a difference other than zero. It is this difference which constitutes the bipolar video output.

In accordance with an important aspect of the present invention, the amplification in the undelayed channel 29 is automatically varied with respect to the other channel 28 to assure such amplitude cancellation. Although it is preferred to thus change the amplification of the undelayed channel for this purpose, satisfactory results may be obtained if the amplication in the delayed channel 28 is automatically varied. This is for the purpose of canceling nonchanging signals with precision. In the event that nonchanging signals are not canceled completely, their resultant produces an effect, either on a cathode ray tube or in a controlled mechanism, the same as would be produced by a moving target.

By thus changing the amplification of the signals in one channel with respect to the other, the non-changing signals from the delayed and undelayed channels have the same amplitude in the input circuit to the subtraction or cancellation circuit 38. Not only is it desirable that the signals from each one of the channels 28, 29 have the same amplitude at the input to the cancellation circuit but, preferably, they should also have the same shape. The shapes of the two signals from the channels 28, 29 are substantially the same if the over-all frequency response of each signal channel 28, 29 is the same, and if both amplifier channels 28, 29 are operated linearly.

Therefore, it is desirable that not only should the relative gains in the two amplifier channels 28, 29 be controlled one with respect to the other but also in controlling their amplification due regard should be had to obtain equal frequency response in each channel, even though the gain of one channel is varied with respect to the other channel.

This problem is complicated somewhat by the fact that the delay line 31 produces an attenuation of approximately 70–80 decibels in the signal passing therethrough and also introduces frequency distortion. This requires the gain of the delayed channel 28 to be considerably greater than the gain produced in the undelayed channel 29. Furthermore, the delay line 31 affects the frequency response of channel 28 only and a compensatory effect is introduced in the delayed channel 28 to correct this condition. This compensatory effect, as described hereinbefore, is accomplished by the compensation circuit 102, 103 in the delay channel.

The manner in which the gain of the undelayed channel 29 is controlled, by controlling the continuous potential on the lead 182 (Figures 1 and 2), is described generally hereinabove, but is described with greater detail hereinafter.

When the gain of the undelayed channel 29 is thus adjusted so that the average carrier level of signals in the channels 28, 29 are at the same level, the signals from stationary targets are canceled in the cancellation network 38 and the junction point 38A of the resistances 164, 165 is at zero potential with respect to ground. The potential of this junction point 38A has positive and negative values occasioned by reflections from a moving target. In other words, the video signals produced at the output of the cancellation network 38, occasioned by moving targets, are bipolar in nature and may have an extremely wide range of amplitude. Because of this wide range of amplitude, preferably special circuits are used in the video amplifier 43 which follows.

The junction point 38A is coupled to the main control grid of device 250 through the coupling condenser 251. Bias voltage is applied to such control grid from the negative lead 220 which is connected to ground through the fixed resistance 252 and potentiometer type of resistance 253 whose tap is connected to such grid through serially connected resistances 254, 255. The junction point of resistances 254, 255 is effectively grounded for high frequencies by the condenser 256. The resistance capacitance network, including elements 254, 255 and 256 thus provides a short time constant network between the cancellation network 38 and the amplifier stage 250. This time constant network is desirable since it serves the purpose of reducing the deteriorating effect which the flow of grid current in device 250 may otherwise have on positive peaks on large amplitude signals. This network also materially reduces the effect of clouds and CW (continuous wave) jamming signals, when present.

Gain of the bipolar video amplifier 250 may be controlled by varying the grid bias of the variable mu tube 250 by varying the position of the tap on the resistance 253. Little nonlinearity is introduced here because most of the video present is at a low level compared to signals in the following stages.

In order to accommodate large amplitude bipolar video signals in the second stage 260 without incurring the risk of grid current deterioration of video, a direct current coupling path is used between the stages 250 and 260. For this purpose, the anode of device 250 is connected directly to the control grid of device 260. To establish the proper voltage relationships in the direct current coupled stage 260, that is, to keep the average grid voltage of the second stage 260 negative with respect to the cathode a sufficiently large value of cathode resistance consisting of resistance 261 is used in stage 260, this resistance 261 being shunt connected to the bypass condenser 264. The cathode of device 260 thus operates at a potential of approximately 85 volts above ground.

Space current for device 250 is supplied from the high positive potential lead 265 through the device 266 having its twin elements connected in parallel and through the serially connected choke coil 267 and resistance 268. The purpose of the device 266 serves as a voltage dropping resistance to bring the anode supply voltage of 250 volts down to 80 volts at the anode of device 250 and the connected grid of device 260. Space current for device 260 is supplied from lead 265 through resistance 270, inductance coil 271 and resistance 272.

The amplified bipolar signals present on the anode of device 260 are applied to the first control grid of the twin triode device 274 through a coupling condenser 273. The device 274 serves as a phase splitter arranged to drive a full wave crystal rectifier circuit referred to as the final detector and includes the rectifier elements 47, 48.

The two germanium crystals 47, 48 are arranged in a full wave rectifier circuit, which responds to the push-pull bipolar video signals on the anodes of device 274 and produces unipolar video on the grid of device 49. This final detector is not a detector in the usual sense of demodulating an R. F. carrier, but serves as a rectifier to convert bipolar video signals to video of single polarity. The final detector is followed by a single 6AK5 video amplifier stage 49, which drives a 6J6 cathode-follower output stage 50.

The MTI-cancelled video output of the cathode follower 50 is sent to the video selector 52 so that it may be used on the screen of the search indicator or may be used to effect a control operation.

The video selector 52 in Figure 1 is adapted to accept normal video from the MTI receiver, MTI-cancelled video from the comparison amplifier, and trigger from the ATC unit. It may deliver range-gated video to the video amplifier of a search indicator. Range-gated video consists of MTI video extending out to a certain range, but with normal video beyond that range.

The video selector 52 may feed either MTI or normal video signals for presentation upon the search indicator, or may gate the presentation of both, or may allow for mixing of a proportion of normal video with MTI video.

As indicated above, in order to make possible cancellation of unchanging video signals in the cancellation circuit 38, corresponding echoes must be presented to this circuit at precisely the same time. This simultaneity is known as temporal cancellation. The automatic temporal cancellation (A. T. C.) unit makes possible the realization of temporal cancellation over long periods of time by making the frequency of the master, or system, trigger dependent upon the variations in delay encountered in the delay line. If the temperature changes of the line are such as to increase the delay, tending to spoil temporal cancellation, the frequency of the master oscillator is lowered a corresponding amount so that the repetition interval is equal to the delay interval.

Thus, the automatic temporal cancellation control described in greater detail hereinbelow supplies the system trigger, and continuously corrects the pulse recurrence frequency to compensate for changes in the amount of delay present in the delay line.

Synchronization requirements in the MTI system are more exacting than in a system not incorporating MTI. It is apparent that any significant jitter in the pulse repetition rate for MTI would be intolerable since such jitter would cause the signals from the delayed and undelayed channels to reach the subtraction circuit with imperfect temporal cancellation. Because one-half microsecond pulses are used in the system, the allowable jitter must be relatively small. Preferably, the jitter in the MTI system should be less than 1/200 microsecond for good cancellation of stationary targets.

As indicated hereinabove, a tracking pulse 356 is generated in the A. T. C. unit and is transferred through MOPA 24, through the delay line 31 and delayed amplifier 28 and is returned to the A. T. C. unit for time comparison after being detected at the rectifier 45A.

The specific circuit arrangement for detecting the tracking pulse at 45A is shown in detail in Figure 2 wherein a portion of the amplified output from the delayed channel 28 appears across the resistance 143 as described hereinabove.

The voltage appearing across resistance 143 is applied to the coil 302 which is self-resonant at 15 megacycles per second through the condenser 303. This voltage applied to coil 302 is rectified in the detector 45A and is filtered by the coil 304 and condenser 305 so that substantially all of the demodulated tracking pulse appears across the resistance 306.

The demodulated tracking pulse is then applied to the two-stage amplifier stage 46A whose output is connected to the tracking pulse amplifier 47A (Figures 1 and 3) in the A. T. C. unit, after which it is applied to the cathode follower stage 48A and then applied to the coincidence circuit 49A for comparison with an early gate and a late gate developed in the A. T. C. unit from the oscillator 300 and associated network which is described in detail.

The timing oscillator 300 is preferably a simple stable low frequency oscillator capable of accepting a small unidirectional error voltage to change its frequency. For this purpose, the oscillator 300 is a resistance capacitance type of phase shift oscillator producing a sine wave output at 2,000 cycles per second.

The error voltage is applied to the main control grid of the oscillator tube or stage through a resistor 310 in the feedback circuit of the oscillator. The frequency of the oscillator stage 300 may be varied by adjusting the values of the resistance and capacity components, for example, by varying the position of the movable tap on resistance 311; and further, such frequency may also be varied over a small range by changes in such unidirectional error voltage applied to the grid of tube 300 through the single pole, double throw switch 312.

The main control grid 313 swings positive over a portion of a frequency cycle, and the total time during which the grid is positive to produce grid current during one cycle is determined, of course, by the polarity of the grid. When the grid becomes positive, the dynamic control grid resistance produces a grid current flow through resistance 310, or, in other words, the phase shift feedback network in the oscillator stage 300 is loaded. Such loading, in turn, determines the phase shift characteristic of the feedback circuit to thereby determine the frequency of oscillations generated in the oscillator stage 300. Thus, the oscillator stage 300 is arranged to accept corrective information in the form of a unidirectional error voltage applied to lead 314 to alter its frequency in accordance with the information received.

The oscillator stage 300 feeds a cathode follower buffer stage 316, which in turn feeds a regenerative pickoff or trigger circuit comprising the pulse transformer 317, clamper or regenerative pickoff diode 318, and regenerative pickoff tube 319. This regenerative trigger generating circuit produces a sharp trigger or timing pulse 320 which is used to drive the tracking pulse generator and the gating circuits included in the coincidence circuit 49A. The function of such trigger generating circuit is to provide a stable trigger at the proper repetition interval which corresponds to the signal transit time in the signal line.

This regenerative trigger generating circuit, including the pulse transformer 317, generates a virtually jitter-free timing pulse 320 having the same frequency as the frequency of oscillations generated by the oscillator 300. This pulse 320 is used to drive another cathode follower buffer stage 321 which couples the timing pulse 320 through the artificial transmission or delay line 322 to the tracking pulse generator or blocking oscillator stage 323 whose output in the form of a tracking pulse 356 is transferred through conductor 415 to the attenuator 42A (Figure 1) and thence to the input of MOPA 24 for transmission down the delay line 31 in the form of a modulation component of a 15 megacycle carrier generated in MOPA.

Such tracking pulse 356 supplied from the cathode load resistance 323A, besides being transferred to the attenuator 42A for modulating the 15 microsecond carrier wave generated in MOPA 24, is supplied to the terminal 323B which is connected to supply the timing pulses to the synchronizer 340, i. e., to time the operation of the synchronizer stage 340.

Also, the output of buffer stage 321 in the form of a pulse 320 is applied through the buffer stage 325A to the early gate generator 325, Figure 1, comprising oscillator 326 which produces an early gate 327 approximately one microsecond in duration. The trailing edge of the early gate 327, buffer stage 330A, in turn triggers the late gate generator 330 comprising oscillator 329 which produces another one microsecond gate 331 known as the late gate.

Thus, the timing pulse 320 initiates an early gate 327 and the back edge of the early gate initiates a late gate 331. These two early and late gates are each about one microsecond in length and both feed into the coincidence circuit 49A.

The output of the late gate generator 330 is used to initiate the operation of a clamping gate generator 402 comprising the tubes 402A and 402B. The output of this gate generator 402 is in the form of a negative gating voltage of, for example, 15 microseconds duration and has the reference numeral 400A. The gating voltage 400A thus developed is applied to the buffer amplifier stage 406, the output of which appears as a positive clamping voltage 412 having a time duration of 15 microseconds. It is this gating voltage 412 which is applied to the error detector 408, which is shown in block form in Figure 1 and in greater detail in Figure 2B. The gating voltage developed at the anode of tube 402B appears as a positive gating voltage 412B which is applied to the buffer stage 404. The output of stage 404 appears as the negative gating voltage 412C and is applied through condenser 414 to the lead 415 connected to the attenuator 42A, it being noted that such lead 415 conveys both the tracking pulses 356, in the form of positive pulses, and the elongated negative pulses 412C, with the pulses 412C lagging a short time interval after the tracking pulse 356, as illustrated in Figure 4.

Thus, the circuitry illustrated in Figure 3, besides producing the tracking pulse 356 to obtain temporal cancellation, also generates the elongated negative sampling pulse 412C which follows such tracking pulse for effecting automatic amplitude cancellation.

The early and late gates 327, 331, occurring one microsecond apart, are applied to the coincidence circuit 49A comprising the pulse transformer 342 and connected tubes 343, 344. These early and late gates are applied as anode voltages to the coincidence tubes 343, 344, the early gate 327 being applied to the anode of tube 343 and the late gate 331 being applied to the anode of tube 344.

In the meantime, as mentioned above, the tracking pulse output from tube 323 has gone to the input of MOPA 24 and has been sent through the delay line 31 on the 15 megacycle carrier generated in MOPA. This tracking pulse emerges from the delay line and connected delay amplifier and is demodulated by the detector 45A. This detector circuit delivers a negative pulse 356, followed by a positive gate 412C, to the electron tube 46A. The self-bias on the 2.2 megohm grid resistor 46C causes the second section of this tube to clip the signal so that only pulse 356 appears in the output of this tube. Gate 412C is thus not fed to amplifier 47A. This tracking pulse, after demodulation, is then amplified by the four-stage tracking pulse amplifier 47A comprising tubes 350, 351, 352 and 353. After amplification in the four-stage amplifier 47A, the tracking pulse 356 is applied to the coincidence circuit 49A through transformer 342 after having been subjected to the delay variations in the 1,000 microsecond mercury delay line 31.

When the delayed tracking pulse 356 lies symmetrically in the space between the early gate 327 and the late gate 331, as shown in Figure 1, the continuous voltage developed in the coincidence circuit 49A is of a predetermined magnitude and is applied to lead 314 through switch 312. So long as the voltage has such predetermined magnitude, the frequency of oscillations generated in the resistance capacitance oscillator 300 remains the same. Such voltage changes, however, when the tracking pulse 356 is closer to one of the gates 327, 331 than the other. This change in voltage applied to lead 314 causes the frequency of oscillations generated in the oscillator 300 to change in such a direction so as to space the tracking pulse 356 equally between the early and late gates 327, 331.

Thus, a change in the continuous potential applied to lead 314, resulting from the tracking pulse 356 lying more in one gate than the other, results in a continuous voltage applied to the timing oscillator 300 so as to change its frequency in such a direction as to correct the trigger timing error. Specifically, the error voltage applied to the oscillator 300 through lead 314 results from the negative charge on the condenser 360 in the coincidence circuit 49. The magnitude of the charge in condenser 360 is dependent upon the conduction of tubes 343 and 344, since an increase in conduction of one of the tubes 343, 344 increases the voltage across the terminals of condenser 360 and conversely such voltage is decreased when the other one of said tubes becomes more conductive.

In order to effect coincidence of the tracking pulse 356 in time with the center of the early and late gates 327, 331, it is desired to add a small additional delay in series with the tracking pulse 356 in the order of one-half the width of the early gate 327. This delay is thus in the order of one-half microsecond and may be varied to obtain good temporal cancellation by varying the position of the seven position switch 362.

It is noted that the oscillator stage 300 operates at a normal frequency of 2,000 cycles per second and that the time pulse interval is in the order of 500 microseconds, and the delay of the mercury delay line 331 is in the order of 1000 microseconds. This means that a given tracking pulse 356 arrives at the coincidence circuit 49A along with the early and late gates occurring two timing pulses late rather than with the gates 327, 331 occurring on the next timing pulse. Operation of the circuit is thus the same as if the delay were 500 microseconds, except that there are always two tracking pulses in the delay line 31, 500 microseconds apart, with a video train following every other tracking pulse.

Video signals occurring in the tracking pulse detector 45A of the comparison amplifier are thus of substantially no consequence, provided that such signals do not arrive at the coincidence circuit 49A of the automatic temporal control unit at the times when the early and late gates 327, 331 are supplying anode voltage to tubes 343, 344.

To insure that neither receiver noise nor video signals from strong distant targets, for example, targets at 45 miles, will be superimposed on the tracking pulse 356, the COHO gate generator 13B is supplied with trigger pulses from the terminal 323B and the buffer stage 13C is adjusted so that the MTI receiver is switched off at some time later than 350 microseconds after the main pulse is transmitted from antenna 9 to thereby allow detection of moving targets in the normal range of 30 miles. This time is greater than 350 seconds and is preferably shorter than the time required before the occurrence of the tracking pulse. The time occurrence of the tracking pulse is approximately 475 microseconds corresponding to a distance of approximately 45 miles.

It is noted further that before the trigger generating system, including the stages 317, 318 and 319, may operate automatically, the tracking pulse 356 should be of sufficient amplitude to cause the switch tubes 343, 344 of the coincidence circuit 49A to open at the proper time. It is noted that the amplitude of this tracking pulse depends on the gain control settings in the MOPA unit 24, as well as the settings of the gain controls in the delayed channel 28 of the comparison amplifier. Therefore, these controls should initially be set for proper range, then the potentiometer resistance 177 may be adjusted to substantially its full gain position. As noted previously, potentiometer resistance 177 controls the continuous potential on the automatic gain control lead 182 of the undelayed channel 29.

Now that the automatic temporal cancellation apparatus has been described in detail, the apparatus for obtaining automatic amplitude cancellation is described in greater detail with reference to Figures 1, 2A and 2B.

In Figure 2B the clamp gating voltage 412 is applied to the terminal 430A, and, assuming that the cancellation of the sample pulse 412C in the cancellation network is not complete, the pulse originally transmitted down the delay line for comparison with such clamp gating voltage is obtained from the terminal 38A and applied to the first video amplifier 426. This pulse 412C obtained from terminal 38A will have a polarity and amplitude determined by the sense and magnitude of the mismatch in the amplitudes of the opposing signals fed through resistances 164 and 165. In general, the error detector stage 408, represented in block diagram in Figure 1, includes the video amplifier tube 426, the cathode follower tube 428, and clamping triodes 430, 432. The output of such error detector 408 is applied to the cathode follower tube 410. The D. C. voltage appearing in the cathode circuit of tube 410 is applied through the single pole, double throw relay switch 500A to the automatic gain control lead 182 of the undelayed channel 29. Crystal 434 is a protective device to prevent the output automatic gain control voltage from going positive in case of maladjustment of the controls.

More specifically, the video applied to the control grid of tube 426 is bipolar in nature and after amplification is applied to the control grid of the cathode follower stage 428. The cathode of the tube 428 is connected to the negative lead 220 through the serially connected variable resistance 436 and fixed resistance 438. The position of the tap on the resistance 436 determines the reference voltage level, and such tap is applied to the cathode and anode of the clamping tubes 430, 432, which provide a conducting path for either negative or positive voltages appearing at the tap on resistance 436; provided, of course, that at such time the clamp gating voltage 412 is applied to the control grids of these tubes to unclamp the same, i. e., to render either one of them conducting, as the case may be. The anode and cathode of the tubes 430, 432 are both connected to the control grid of the cathode follower tube 410, which has its cathode connected to the negative lead 220 through the potentiometer 440 and fixed resistance 442.

It is noted that there is a relatively large condenser 444 connected between the control grid of the tube 410 and ground, and such condenser comprises an integrating circuit for establishing an average continuous potential on the control grid of tube 410, to in turn establish an average potential on the tap of resistance 440. Such voltage appearing at the tap of resistance 440 is transferred through the resistance 446 and relay switch 500A to the automatic gain control lead 182 for effecting the gain in the four variable mu tubes 170, 171, 172 and 173. The gain of undelayed channel 29 is thus controlled automatically in accordance with the magnitude and polarity of the reference voltage from the tap of potentiometer 436 during the time that clamper gate 412 allows conduction in tubes 430 and 432.

Since the spacing is maintained substantially constant by the automatic temporal cancellation system described above, the gain of the undelayed channel under such condition is controlled in accordance with the difference in magnitudes between such voltages 412 and 412C, although it is understood that such spacing has a relatively small effect on the operation of the automatic amplitude cancellation unit as such.

Further, since the magnitude of the sampling pulse 412C is determined by the gain in the comparison amplifier, the gain of the undelayed channel is controlled in accordance with changes taking place in either channel. By this expedient, amplitude cancellation of echo signals resulting from fixed targets is accomplished.

It is noted that the amplification in the delayed channel 28 may be manually controlled or set at a predetermined level by adjusting the position of the tap on resistance 502, which has one of its terminals grounded and the other one of its terminals connected to the negative lead 220. To effect a like manual control of the gain of the undelayed channel 29 (assuming the switch 510 is in its position shown in Figure 2B), the tap on the resistance 512 is adjusted, it being noted that resistances 502 and 512 are connected in shunt.

To obtain the aforementioned automatic control of gain in the undelayed channel 29, the relay switch 500A associated with relay winding 500 must first be actuated. This is accomplished by actuating the switch 510 to its automatic position, in which case the relay winding 500 is energized with current from source 515 to actuate switch 510.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, an antenna system, a transmitter, means controlling the repetition rate at which energy pulses are delivered from said transmitter to said antenna system, receiving means for receiving reflected energy as a result of each pulse, in the form of a train of echo signals, with each signal corresponding to a differently located reflecting object, a delay network, a first channel amplifier serially connected with said delay network and coupled to said receiver for transmission therethrough of a delayed train of echo signals, said delay network imposing a time delay which is substantially equal to the repetition rate of said pulse, a second channel amplifier coupled to said receiver for transmission therethrough of a train of undelayed echo signals, said repetition rate controlling means including a tracking pulse generator, means coupling said tracking pulse generator to said delay network for transmission of a tracking pulse therethrough, said repetition rate controlling means including means for varying the repetition rate of said pulse in accordance with the time required for said tracking pulse to be transmitted through said delay network, a pulse generator generating sampling pulses in timed relationship with said tracking pulse, means impressing said sampling pulses on each one of said channel amplifiers, and means controlling the gain of one of said channel amplifiers in accordance with the difference in intensity of the sampling pulses in said channel amplifiers.

2. In a system of the character described, an antenna system, a transmitter, means controlling the repetition rate at which energy pulses are delivered from said transmitter to said antenna system, receiving means for receiving reflected energy as a result of each pulse, in the form of a train of echo signals, with each signal corresponding to a differently located reflecting object, a delay network, a first channel amplifier serially connected with said delay network and coupled to said receiver for transmission therethrough of a delayed train of echo signals, said delay network imposing a time delay commensurate with the repetition rate of said pulse, a econd channel amplifier coupled to said receiver for transmission therethrough of a train of undelayed echo signals, said repetition rate controlling means including a tracking pulse generator, means coupling said tracking pulse generator to said delay network for transmission of a tracking pulse therethrough, said repetition rate controlling means including means for controlling the repetition rate of said pulse in accordance with the time required for said tracking pulse to be transmitted through said delay network, means generating sampling pulses in timed relationship with said tracking pulse and impressing said sampling pulses on each one of said channel amplifiers, and means controlling a characteristic of one of said channel amplifiers in accordance with the difference in intensity of the sampling pulses in said amplifiers.

3. In a system of the character described, an antenna system, a transmitter, means controlling the repetition rate at which energy pulses are delivered from said transmitter to said antenna system, receiving means for receiving reflected energy as a result of each pulse, in the form of a train of echo signals, with each signal corresponding to a differently located reflecting object, a delay network, a first channel amplifier serially connected with said delay network and coupled to said receiver for transmission therethrough of a delayed train of echo signals, said delay network imposing a time delay commensurate with the repetition rate of said pulse, a second channel amplifier coupled to said receiver for transmission therethrough of a train of undelayed echo signals, said repetition rate controlling means including means for generating both a tracking pulse and a sampling pulse, means coupling the last mentioned means to said delay network for transmission of said tracking and sampling pulses therethrough, said repetition rate controlling means including means for varying the repetition rate of said tracking pulse and sampling pulse in accordance with the time required for said tracking pulse to be transmitted through said delay network, means impressing said sampling pulse on each one of said channel amplifiers, and means controlling the gain of one of said channel amplifiers in accordance with the difference in intensity of the sampling pulse in said channel amplifiers.

4. In a system of the character described, a comparison amplifier comprising: a delay network, a delayed channel amplifier coupled to said delay network, an undelayed channel amplifier, a cancellation network connected between the output circuits of said delayed and undelayed channel amplifiers; an automatic temporal cancellation unit including a tracking pulse generator, a sampling pulse generator; a transmitter timed in accordance with the appearance of said tracking pulse for producing a transmitted pulse whereby a resulting train of echo signals may be produced and applied to both said delayed and undelayed channel amplifiers, said cancellation network being effective to produce a differential voltage which is the difference between the intensity of the sampling pulse in the delayed and undelayed channel amplifiers, and means controlling the gain of one of said channel amplifiers in accordance with said differential voltage.

5. In a system of the character described, a delayed channel amplifier, an undelayed channel amplifier, a cancellation network interconnecting the output circuits of said delayed and undelayed channel amplifiers, means impressing a sampling pulse on both said delayed and undelayed channel amplifiers to produce a differential voltage in said cancellation network which is a measure of the difference of the sampling pulse in said delayed and undelayed channel amplifiers, an error detector stage coupled to said cancellation network, means gating said error detector stage in timed relationship with the appearance of sampling pulses in said cancellation network, and means coupling the output of said error detector stage to one of said channel amplifiers to automatically vary the gain of the channel amplifier in accordance with said differential voltage.

6. In a system of the character described, an antenna system, a transmitter, means controlling the repetition rate at which energy pulses are delivered from said transmitter to said antenna system, receiving means for receiving reflected energy as a result of each pulse, in the form of a train of echo signals, with each signal corresponding to a differently located reflecting object, a delay network, a first channel amplifier serially connected with said delay network and coupled to said receiver for transmission therethrough of a delayed train of echo signals, said delay network imposing a time delay which is substantially equal to the repetition rate of said pulse, a second channel amplifier coupled to said receiver for transmission therethrough of a train of undelayed echo signals, said repetition rate controlling means including means for generating a tracking pulse, said repetition rate controlling means including means for varying the repetition rate of said transmitted pulses in accordance with the time required for said tracking pulse to be transmitted through said delay network, pulse generating means for producing sampling pulses in timed relationship with said tracking pulse, means impressing said sampling pulse on each one of said channel amplifiers, and means controlling the gain of one of said channel amplifiers in accordance with the difference in intensity of the sampling pulse in said channel amplifiers.

7. In a system of the character described, a transmitter, an antenna coupled to said transmitter, means for keying the operation of said transmitter, a receiver coupled to said antenna to receive transmitted energy in the form of echoes, said receiver incorporating means for indicating said echo signals, a modulator stage coupled to said receiver and modulated in accordance with said echo signals, a delay network, a first channel and a second channel, said first channel including said delay network, coupled to said modulator, detecting means in said first and second channels, a cancellation network connected between the detector in the first and second channels, an indicator coupled to said cancellation network and producing indications in response to the difference in voltages applied thereto from said first and second channels respectively, an automatic temporal cancellation unit including a variable frequency oscillation network, a wave shaping network coupled to said oscillation network to derive a series of substantially peaked pulses therefrom in timed relationship to the frequency of oscillations generated in said oscillation network, an early gating voltage generator coupled to said oscillation network for initiating an early gating voltage, a late gating voltage generator coupled to said early gating voltage generator for deriving therefrom a late gating voltage, means coupling said late gating voltage to said keying means for operating said transmitter in timed relationship with the frequency of oscillations generated in said oscillation network, a coincidence circuit coupled to both said early gate and late gate voltage generators, means coupling said modulator stage to said oscillation network to produce a carrier voltage modulated in accordance with voltages derived from said oscillation network in the form of a tracking pulse and sampling pulse, means transmitting said tracking pulse through said delay network in said first channel and to said coincidence circuit, and means coupled to said coincidence circuit for automatically varying the frequency of oscillations in said oscillation network, means transmitting said sampling pulse through each one of said channels, and means controlling the amplification in one of said channels in accordance with the difference in amplitude of said sampling pulse in said channels.

8. In a system of the character described, a transmitter, an antenna coupled to said transmitter, means for keying the operation of said transmitter, a receiver coupled to said antenna to receive transmitted energy in the form of echoes, said receiver incorporating means for indicating said echo signals, a delay network, a first channel and a second channel, said first channel including said delay network, a cancellation network connected between the first and second channels, an indicator coupled to said cancellation network and producing indications in response to the difference in voltages applied thereto from said first and second channels respectively, an automatic temporal cancellation unit including a variable frequency oscillation network, a wave shaping network coupled to said oscillation network to derive a series of substantially peaked pulses therefrom in timed relationship to the frequency of oscillations generated in said oscillation network, an early gating voltage generator coupled to said oscillation network for initiating an early gating voltage, a late gating voltage generator coupled to said early gating voltage generator for deriving therefrom a late gating voltage, means keying said transmitter in timed relationship with the frequency of oscillations generated in said oscillation network, a coincidence circuit coupled to both said early gate and late gate voltage generators, means coupling said delay network to said oscillation network to transmit a tracking pulse, means coupling said delay network to said coincidence circuit, means coupled to said coincidence circuit for automatically varying the frequency of oscillations in said oscillation network, means for developing a sampling pulse and for impressing the same on each of said channels, and means controlling the gain of one of said channels in accordance with the difference in intensity of the sampling pulses in said channels.

9. In a system of the character described, an antenna system, a transmitter coupled to said antenna system, means keying the operation of said transmitter, a radio receiver coupled to said antenna system for receiving energy in the form of echo signals produced as a result of reflected energy transmitted by said transmitter, a delay network, a first channel amplifier serially connected with said delay network coupled to the output of said receiver, a second channel amplifier coupled to the output of said receiver, a cancellation network connected between said first and second channel amplifiers to derive a differential voltage which is equal to the difference in voltages appearing at said first and second channel amplifiers, indicating means, means coupling said cancellation network to said indicating means, a variable frequency oscillation network coupled to said keying means for operating the same, means deriving a tracking pulse and a sampling pulse from said oscillation network, means applying said tracking pulse on one of said channel amplifiers to transmit said tracking pulse therethrough, means controlling the frequency of oscillations generated in said oscillation network in accordance with the time required for said tracking pulse to travel through said one channel amplifier, means impressing said sampling pulse on each one of said channel amplifiers, and means controlling the amplification in one of said channel amplifiers in accordance with the difference in intensity of the sampling pulse transmitted through said amplifiers.

10. In a system of the character described, a transmitter, an antenna system coupled to said transmitter, means for keying the operation of said transmitter to periodically deliver energy to said antenna system, means controlling the repetition rate of said keying means, a radio receiver receiving reflected energy in the form of echo signals, a delay network, a first channel amplifier, including said delay network, a second channel amplifier, means coupling said echo signals to said first and second channel amplifiers, a cancellation network interconnected between said first and second channel amplifiers to derive a differential control voltage which is a measure of the difference in voltages appearing in said first and second amplifiers, a utilization device, means impressing said differential control voltage on said utilization device, said repetition rate control means including a trigger voltage generator, means coupling said trigger voltage generator to said keying means to operate the same in accordance with trigger voltages generated in said trigger voltage generator, means deriving a tracking pulse and sampling pulse from said trigger voltage generator, means impressing said tracking pulse and sampling pulse on said delay network, means deriving from each trigger voltage a pair of time spaced control voltages, a coincidence circuit, means for impressing said time spaced control voltages and said tracking pulse, after it passes through said delay network, on said coincidence circuit, said coincidence circuit including means for deriving a control voltage which varies in accordance with the relative spacing of said tracking pulse with respect to said time spaced voltages, means automatically varying the repetition rate of said trigger generator in accordance with the last mentioned control voltage, means impressing said sampling pulse on each one of said channel amplifiers and means controlling the amplification of one of said channel amplifiers in accordance with the difference in intensity of the sampling pulse appearing in said channel amplifiers.

11. In a system of the character described, a transmitter, an antenna system coupled to said transmitter, means controlling the repetition rate at which energy is delivered to said antenna system from said transmitter, said repetition rate controlling means including a trigger voltage generator, means deriving a sampling pulse from said generator, a radio receiver receiving reflected energy in the form of echo signals, a delay network, a first channel amplifier including said delay network coupled to said receiver for transmission of said echo signals therethrough, a second channel amplifier coupled to said receiver for transmission of echo signal therethrough, means impressing said sampling pulse on each one of said channel amplifiers, means coupled to said first and second channel amplifiers for deriving a differential voltage which is a measure of the difference in instantaneous voltages appearing in said first and second channel amplifiers, a utilization device, means impressing said differential voltage on said utilization device, means automatically controlling the gain of one of said channel amplifiers in accordance with the difference in intensity of the sampling pulse appearing at the output of said channel amplifiers, means coupling the output of said trigger voltage generator to said transmitter for effecting operation of the same, means coupling said trigger voltage generator to said delay network, and means automatically varying the repetition rate of said trigger voltage generator in accordance with the time required for the trigger voltage to be transmitted through said delay network.

12. In a system of the character described in which a train of echo signals resulting from a transmitted pulse is subjected to a channel amplifier comprising a delayed and an undelayed channel amplifier for comparison purposes, and wherein the repetition rate of said transmitted pulse is varied in accordance with the time required for a first pulse to be transmitted through said delayed channel, the subcombination comprising means generating an auxiliary sampling pulse in timed relationship with said pulse, means applying said sampling pulse to each one of said channel amplifiers, and means controlling the gain of one of said channel amplifiers in accordance with the difference in intensity of the sampling pulse in said channel amplifiers.

13. In a system of the character described wherein a train of echo signals is produced as a result of a transmitted pulse and wherein said echo signals are transmitted through separate delayed and undelayed channel amplifiers for comparison purposes, and wherein the repetition rate of said transmitted pulse is varied in accordance with the time required for a first pulse to be transmitted through one of said channel amplifiers, the subcombiation comprising, means impressing an auxiliary sampling pulse occurring after said first pulse on each one of said channel amplifiers, and means controlling the gain of one of said channel amplifiers in accordance with the difference in intensity of the sampling pulse in said channel amplifiers.

References Cited in the file of this patent

UNITED STATES PATENTS

| | | |
|---|---|---|
| 2,480,038 | Mason | Aug. 23, 1949 |
| 2,519,359 | Dean | Aug. 22, 1950 |
| 2,532,546 | Forbes | Dec. 5, 1950 |
| 2,540,827 | Mankin | Feb. 6, 1951 |
| 2,548,779 | Emslie | Apr. 10, 1951 |
| 2,608,651 | Emmett | Aug. 26, 1952 |

FOREIGN PATENTS

| | | |
|---|---|---|
| 597,094 | Great Britain | Jan. 19, 1948 |